United States Patent
Belinski-Wolfe et al.

(10) Patent No.: US 7,749,405 B2
(45) Date of Patent: Jul. 6, 2010

(54) WHITE-EMITTING PHOSPHOR BLEND AND ELECTROLUMINESCENT LAMP CONTAINING SAME

(75) Inventors: Judy A. Belinski-Wolfe, Towanda, PA (US); Chung Nin Chau, Athens, PA (US)

(73) Assignee: Global Tungsten & Powders Corp., Towanda, PA (US)

( * ) Notice: Subject to any disclaimer, the term of this patent is extended or adjusted under 35 U.S.C. 154(b) by 708 days.

(21) Appl. No.: 11/164,153

(22) Filed: Nov. 11, 2005

(65) Prior Publication Data

US 2006/0066221 A1 Mar. 30, 2006

Related U.S. Application Data

(63) Continuation-in-part of application No. 10/711,682, filed on Sep. 30, 2004.

(51) Int. Cl.
*C09K 11/56* (2006.01)
*H01L 33/00* (2006.01)

(52) U.S. Cl. .................. 252/301.4 S; 252/301.6 S; 428/690; 428/917

(58) Field of Classification Search .............. 313/503; 252/301.4 S, 301.6 S
See application file for complete search history.

(56) References Cited

U.S. PATENT DOCUMENTS

| | | | | |
|---|---|---|---|---|
| 5,009,808 A | 4/1991 | Reilly et al. | ............. | 252/301.6 |
| 5,156,885 A | 10/1992 | Budd | ............. | 427/70 |
| 5,220,243 A * | 6/1993 | Klinedinst et al. | ............. | 313/502 |
| 5,244,750 A | 9/1993 | Reilly et al. | ............. | 428/690 |
| 5,643,496 A | 7/1997 | Brese et al. | ............. | 353/301.65 |
| 5,702,643 A | 12/1997 | Reddy et al. | ............. | 252/301.65 |
| 6,064,150 A | 5/2000 | Klinedinst et al. | ............. | 313/503 |
| 6,090,311 A | 7/2000 | Brese et al. | ............. | 252/301.65 |
| 6,153,123 A | 11/2000 | Hampden-Smith et al. | ....... | 252/301.45 |
| 6,309,700 B1 | 10/2001 | Fan et al. | ............. | 427/213 |
| 6,580,224 B2 | 6/2003 | Ishii et al. | ............. | 315/169.3 |
| 6,649,946 B2 | 11/2003 | Bogner et al. | ............. | 257/233 |
| 6,682,663 B2 | 1/2004 | Botty et al. | ............. | 252/301.4 R |
| 7,452,483 B2 | 11/2008 | Belinski-Wolfe et al. | .. | 252/301.4 |
| 2001/0008363 A1* | 7/2001 | Sanghera et al. | ............. | 313/496 |
| 2003/0020101 A1 | 1/2003 | Bogner et al. | ............. | 257/233 |
| 2004/0135504 A1 | 7/2004 | Tamaki et al. | ............. | 313/512 |

(Continued)

FOREIGN PATENT DOCUMENTS

CN 1340590 3/2002

(Continued)

OTHER PUBLICATIONS

Korean document indfication grant of Korean patent 849786.*

(Continued)

*Primary Examiner*—C. Melissa Koslow
(74) *Attorney, Agent, or Firm*—Ballard Spahr LLP

(57) ABSTRACT

A white-emitting electroluminescent lamp is provided that uses a phosphor blend comprising a mixture of particles of an electroluminescent phosphor and particles of an europium-activated alkaline earth phosphor having the general formula $Sr_{1-x}Ca_xS:Eu$ where $0 \leq x \leq 1$, wherein the electroluminescent phosphor is selected from a blue-emitting electroluminescent phosphor, a blue-green-emitting electroluminescent phosphor, or a combination thereof. A preferred blend contains from about 5% to about 20% by weight of the europium-activated alkaline earth phosphor.

21 Claims, 2 Drawing Sheets

U.S. PATENT DOCUMENTS

| | | | |
|---|---|---|---|
| 2004/0227705 A1* | 11/2004 | Fujimoto et al. | 345/76 |
| 2005/0156496 A1 | 7/2005 | Takashima et al. | 313/237 |
| 2006/0066209 A1 | 3/2006 | Chau | 313/486 |

FOREIGN PATENT DOCUMENTS

| | | | |
|---|---|---|---|
| CN | 200510107656.4 | | 9/2005 |
| EP | 1001660 | * | 5/2000 |
| EP | 1 104 799 A | | 6/2001 |
| EP | 1 371 711 | | 6/2003 |
| EP | 1 433 831 A | | 6/2004 |
| EP | 1 447 854 | | 8/2004 |
| EP | 05019930.6 | | 9/2005 |
| EP | 1605028 | | 12/2005 |
| EP | 06019597.1 | | 9/2006 |
| EP | 07011710.6 | | 6/2007 |
| JP | 01-302691 | * | 12/1989 |
| JP | 2005-146190 | | 6/2005 |
| KR | 109891/2006 | | 11/2006 |
| WO | WO 00/33390 | | 6/2000 |
| WO | WO 01/69982 | | 9/2001 |
| WO | WO 02/11173 | | 2/2002 |
| WO | WO 03/042327 | | 5/2003 |
| WO | WO 03/080764 A1 | | 10/2003 |
| WO | WO 2004/081140 | | 9/2004 |
| WO | WO 2005/029596 | | 3/2005 |

OTHER PUBLICATIONS

Shionoya et al., *Phosphor Handbook*, Chapter 9, Section 2 (Electroluminescent Materials (Tanaka et al.)), pp. 601-612 (1999 CRC Press LLC).

Abstract, JP 2005-146190, (Jun. 9, 2005).

U.S. Appl. No. 10/711,682, filed Mar. 25, 2004, Chau, Non-Final Rejection, Feb. 4, 2008.

U.S. Appl. No. 10/711,682, filed Mar. 25, 2004, Chau, Response to Non-Final Rejection, May 6, 2008.

U.S. Appl. No. 10/711,682, filed Mar. 25, 2004, Chau, Non-Final Rejection, Aug. 4, 2008.

U.S. Appl. No. 10/711,682, filed Mar. 25, 2004, Chau, Response to Non-Final Rejection, Feb. 5, 2009.

U.S. Appl. No. 10/711,682, filed Mar. 25, 2004, Chau, Final Office Action, May 18, 2009.

U.S. Appl. No. 10/711,682, filed Mar. 25, 2004, Chau, Notice of Appeal, Nov. 18, 2009.

U.S. Appl. No. 11/462,053, filed Aug. 3, 2006, Belinski-Wolfe, Notice of Allowance, Jul. 16, 2008.

* cited by examiner

WHITE-EMITTING PHOSPHOR BLEND AND ELECTROLUMINESCENT LAMP CONTAINING SAME

CROSS REFERENCE TO RELATED APPLICATIONS

This application is a continuation-in-part of copending application Ser. No. 10/711,682, filed Sep. 30, 2004 which is hereby incorporated by reference.

TECHNICAL FIELD

This invention generally relates to electroluminescent (EL) lamps and phosphors, and, more particularly, to electroluminescent lamps for generating white light.

BACKGROUND OF THE INVENTION

Electroluminescence is the emission of light under electric-field excitation. Based on this mechanism, EL lamps are finding an increasing number of applications in the field of flat panel displays due to the growing demand for consumer electronic products, e.g., cellular phones and portable computing devices. EL lamps also provide uniform light emission independent of viewing angle and they are insensitive to mechanical shock and vibration. They can be easily DC-driven at 1.5-9 volts by using inverters that generate AC voltages of about 100-300 V (peak-to-peak) at frequencies of 50 to 1000 Hz.

The two major EL lamp constructions are generally referred to as thin film and thick film. Thin-film EL lamps are made by depositing alternating thin layers of dielectric materials, phosphors and conductive oxides on a glass substrate using a vapor deposition technique such as CVD. Thick-film lamps are made by suspending powdered materials in resinous materials and then applying the materials in layers onto a plastic film using conventional screen printing techniques. Hence, the thick-film EL lamps can be thin, flexible and rugged thereby making them suitable for a wider range of lighting applications.

The phosphors available for thick-film EL lamps are primarily comprised of zinc sulfide that has been doped with various activators, e.g., Cu, Au, Ag, Mn, Br, I, and Cl. Examples of these phosphors are described in U.S. Pat. Nos. 5,009,808, 5,702,643, 6,090,311, and 5,643,496. Typically, the individual particles of the EL phosphors are encapsulated with an inorganic coating in order improve their resistance to moisture-induced degradation. Examples of such coatings are described in U.S. Pat. Nos. 5,220,243, 5,244,750, 6,309,700, and 6,064,150.

For signage and backlighting involving multi-color informational displays, it is important to be able to generate a white light with a high color rendering index (CRI). However, the brightest electroluminescent phosphors emit primarily in the blue to green spectral region at wavelengths from about 400 nm to about 550 nm. This makes it difficult to obtain a high CRI, white emission with EL lamps especially since a satisfactory red-emitting electroluminescent phosphor for thick-film EL lamps has yet to be developed.

SUMMARY OF THE INVENTION

A white-emitting electroluminescent lamp has been developed using a phosphor blend comprising a blue- or blue-green emitting electroluminescent phosphor and an europium-activated alkaline earth phosphor having the general formula $Sr_{1-x}Ca_xS:Eu$ where $0 \leq x \leq 1$, (herein referred to as (Sr,Ca)S:Eu). In the present invention, the (Sr,Ca)S:Eu functions as a photoluminescent phosphor by converting some of the blue- or blue-green light emitted by the electroluminescent phosphor into a red emission. The combined emissions of the electroluminescent phosphor and the (Sr,Ca)S:Eu phosphor produces an overall white emission from the lamp. In terms of CIE x,y color coordinates, white light may be generally defined as the central and generally ellipsoidal region of the CIE chromaticity diagram (also known as a Kelly Chart) shown in FIG. 1. Some common white color points include Daylight (0.333, 0.333), Cool White (0.380, 0.380), and Warm White (0.440, 0.400). (The x,y color coordinates referred to herein are for the 1931 Commission Internationale de l'Eclairage (CIE) Standard Observer (2°)).

The (Sr,Ca)S:Eu phosphor may be co-doped with another activator such as samarium ((Sr,Ca)S:Eu,Sm). A preferred (Sr,Ca)S:Eu phosphor contains from 0 to about 2 weight percent (wt. %) Ca. Preferably, the amount of (Sr,Ca)S:Eu phosphor in the phosphor blend is from about 5 to about 60 weight percent, and more preferably from about 5 to about 20 weight percent. The electroluminescent phosphor is preferably a ZnS:Cu electroluminescent phosphor and may contain other co-activators such as chlorine and gold. Preferably, the electroluminescent phosphor emits primarily between about 400 nm to about 550 nm and the (Sr,Ca)S:Eu phosphor emits primarily between about 580 nm to about 730 nm. In addition, it is preferred to provide the particles of the (Sr,Ca)S:Eu phosphor with a protective coating like the protective coatings applied to EL phosphors. In particular, it is preferred to apply the hydrolyzed trimethylaluminum (TMA) coating described in U.S. Pat. No. 5,220,243.

The white-emitting electroluminescent lamp made with the phosphor blend preferably has an CIE x color coordinate of between about 0.245 and about 0.320 and a y color coordinate of between about 0.300 and about 0.370. More preferably, the x color coordinate is between about 0.250 and about 0.260 and the y color coordinate is between about 0.330 and about 0.370. The lamp exhibits a CRI of at least about 75 and more preferably at least about 80. The blend ratio may have to be adjusted depending on the operating conditions of the lamp since this can affect the intensity of the light emitted by the EL phosphor.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
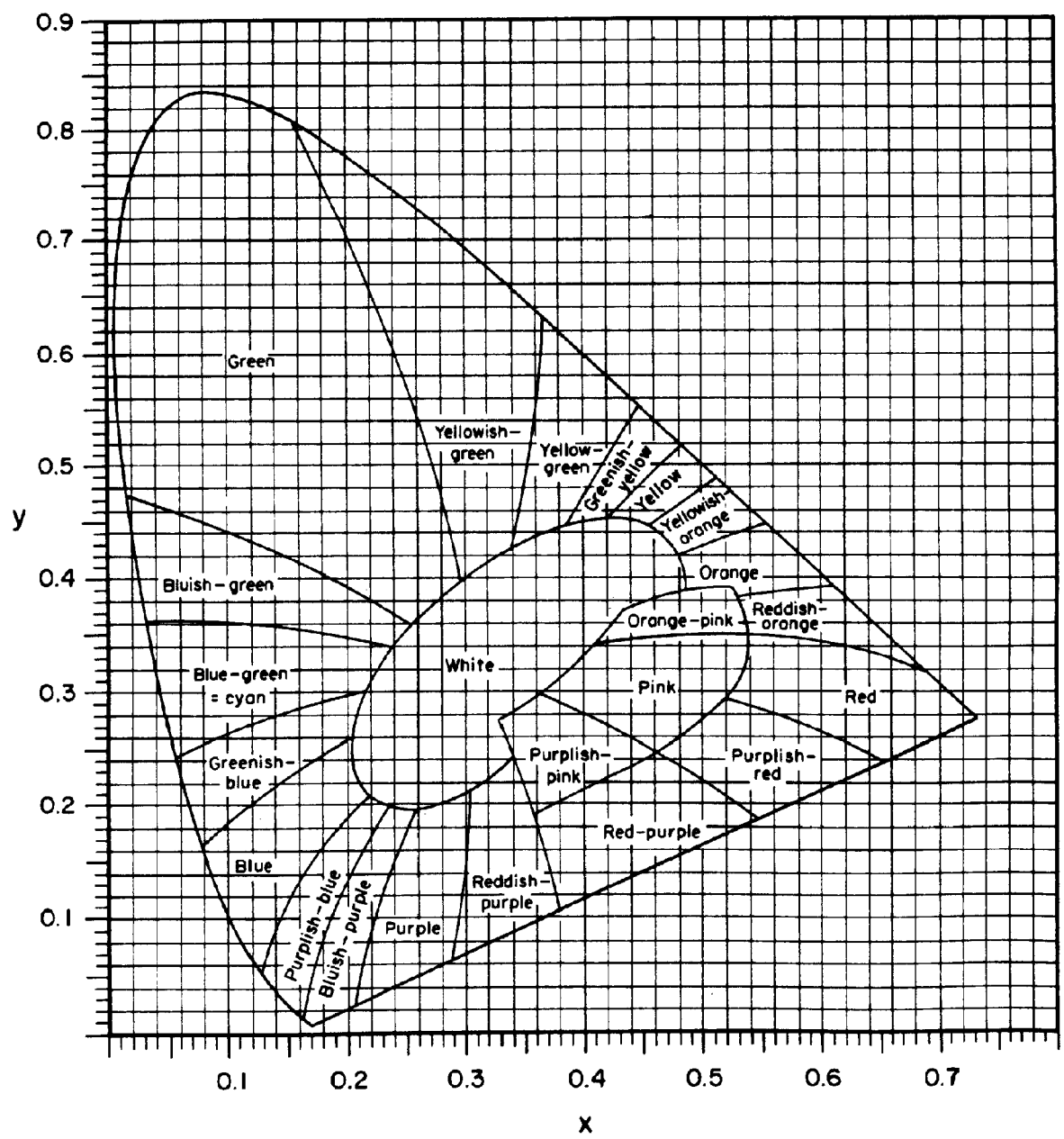
FIG. 1 is a CIE chromaticity diagram showing the various color hues.
Figure 2:
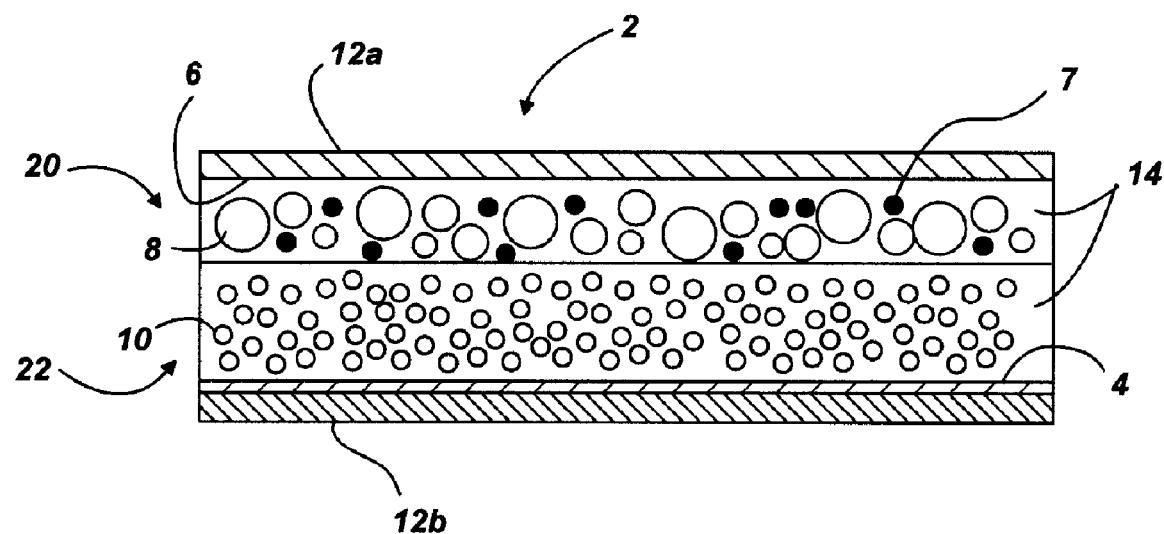
FIG. 2 is a cross-sectional illustration of a thick-film electroluminescent lamp according to this invention.

Referring to FIG. 2, there is shown a cross section of a thick-film electroluminescent lamp 2 according to this invention. The lamp 2 has two dielectric layers 20 and 22. A first conductive material 4, such as graphite, coated on a plastic film 12b forms a first electrode of the lamp 2; while a thin layer of a transparent conductive material 6, such as indium tin oxide, coated on a second plastic film 12a forms a second electrode. Sandwiched between the two conductive electrodes 4 and 6 are two layers 20 and 22 of dielectric material 14 which can be, for example, cyanoethyl cellulose, cyanoethyl starch, poly-(methylmethacrylate/ethyl acrylate) or a fluorocarbon polymer. Adjacent to the first electrode 4 is a layer of dielectric material 14 in which are embedded particles of a ferroelectric material 10, preferably barium titanate. Adjacent to the second electrode 6 is a layer of dielectric material 14 in which are embedded particles of the blue or blue-green emitting electroluminescent phosphor 8 and particles of a (Sr,Ca)S:Eu phosphor 7.

Several phosphor blends were prepared by adding the appropriate amounts of the phosphors to a plastic bottle and blending on a paint shaker for twenty minutes. Two electroluminescent (EL) phosphors were used: OSRAM SYLVANIA Inc.'s GlacierGlo® types GG65 (blue-emitting) and GG25 (blue-green emitting). The amount of the (Sr,Ca)S:Eu phosphor was varied from 10 to 50% by weight (wt. %). The remainder of the blend consisted of types GG65 and GG25, or a combination thereof. The amount of the GG65 EL phosphor ranged from 0 to 60% and the amount of the GG25 EL phosphor ranged from 0 to 70% by weight. The EL phosphors and the (Sr,Ca)S:Eu phosphor had a protective coating of hydrolyzed TMA on the individual phosphor particles. The phosphor blends were incorporated into thick-film EL lamps and operated generally at 100V, 400 Hz.

EXAMPLE 1

A series of six samples were prepared by blending 30, 40 or 50 wt. % of a (Sr,Ca)S:Eu phosphor containing 1.3 wt. % Ca with either type GG65 or GG25 EL phosphor. The lamp data is given in Table 1. Lamp luminance was measured at 24 and 100 hours. The color coordinates of the 40 wt. % (Sr,Ca)S:Eu with GG65 are very close to the coordinates for Daylight White (0.333, 0.333).

TABLE 1

| EL Phosphor | Wt. % (Sr, Ca)S:Eu | 24 hr. luminance (cd/m$^2$) | 100 hr. luminance (cd/m$^2$) | x color coordinate | y color coordinate |
| --- | --- | --- | --- | --- | --- |
| GG65 | 30 | 26.0 | 22.6 | 0.314 | 0.304 |
| GG65 | 40 | 18.5 | 16.0 | 0.333 | 0.331 |
| GG65 | 50 | 11.9 | 10.3 | 0.345 | 0.315 |
| GG65 | 0 | 54.6 | 48.1 | 0.161 | 0.224 |
| GG25 | 30 | 36.2 | 32.1 | 0.331 | 0.425 |
| GG25 | 40 | 25.3 | 22.4 | 0.354 | 0.425 |
| GG25 | 50 | 16.2 | 14.4 | 0.369 | 0.425 |
| GG25 | 0 | 86.3 | 77.1 | 0.176 | 0.396 |

EXAMPLE 2

Three samples were prepared by blending 10, 20 and 30 wt. % of a (Sr,Ca)S:Eu phosphor containing 1.3 wt. % Ca with a 50/50 blend of GG65 and GG25 by weight. The lamp results are given in Table 2. The lamp resulting from the blend of 10 wt. % (Sr,Ca)S:Eu with the EL blend resulted in a preferred white emitting lamp.

TABLE 2

| EL Phosphor | Wt. % (Sr, Ca)S:Eu | 24 hr. luminance (cd/m$^2$) | 100 hr. luminance (cd/m$^2$) | x color coordinate | y color coordinate |
| --- | --- | --- | --- | --- | --- |
| GG65/GG25 | 10 | 56.0 | 49.3 | 0.249 | 0.342 |
| GG65/GG25 | 20 | 40.1 | 35.1 | 0.292 | 0.357 |
| GG65/GG25 | 30 | 32.1 | 28.1 | 0.317 | 0.363 |
| GG65/GG25 | 0 | 72.8 | 64.8 | 0.166 | 0.305 |

EXAMPLES 3 AND 4

Two more series of blends were prepared by blending 10 wt. % of a (Sr,Ca)S:Eu phosphor containing 1.3 wt. % Ca with different ratios of types GG65 and GG25, 30/70 to 60/40 by weight, respectively. The lamp results are given in Table 3. The lamp produced using the 40/60 ratio produced a lamp that was white at both low and high frequencies.

TABLE 3

| GG65/GG25 ratio | Wt. % (Sr, Ca)S:Eu | 24 hr. luminance (cd/m$^2$) | 100 hr. luminance (cd/m$^2$) | x color coordinate | y color coordinate |
| --- | --- | --- | --- | --- | --- |
| 30/70 | 10 | 55.4 | 49.1 | 0.253 | 0.371 |
| 35/65 | 10 | 54.1 | 47.9 | 0.253 | 0.365 |
| 40/60 | 10 | 51.6 | 46.3 | 0.259 | 0.361 |
| 45/55 | 10 | 51.0 | 45.6 | 0.258 | 0.353 |
| 50/50 | 10 | 50.6 | 45.1 | 0.257 | 0.345 |
| 55/45 | 10 | 50.6 | 45.0 | 0.256 | 0.338 |
| 60/40 | 10 | 49.2 | 43.8 | 0.254 | 0.331 |

While there has been shown and described what are at the present considered the preferred embodiments of the invention, it will be obvious to those skilled in the art that various changes and modifications may be made therein without departing from the scope of the invention as defined by the appended claims.

What is claimed is:

1. An electroluminescent lamp including a phosphor blend comprised of a mixture of particles of an electroluminescent phosphor and particles of an europium-activated alkaline earth phosphor having the general formula $Sr_{1-x}Ca_xS:Eu$ where $0 \leq x \leq 1$, the electroluminescent phosphor selected from a blue-emitting electroluminescent phosphor, a blue-green-emitting electroluminescent phosphor, or a combination thereof; and wherein the lamp exhibits a CRI of at least about 75.

2. The lamp of claim 1 wherein the lamp exhibits a CRI of at least about 80.

3. The lamp of claim 1 wherein the lamp emits a white light having an x color coordinate of between about 0.245 and about 0.320 and a y color coordinate of between about 0.300 and about 0.370.

4. The lamp of claim 1 wherein the lamp emits a white light having an x color coordinate of between about 0.250 and about 0.260 and the y color coordinate of between about 0.330 and about 0.370.

5. The lamp of claim 1 wherein the europium-activated alkaline earth phosphor is codoped with samarium.

6. The lamp of claim 1 wherein the electroluminescent phosphor emits primarily between about 400 nm to about 550 nm and the europium-activated alkaline earth phosphor emits primarily between about 580 nm to about 730 nm.

7. The lamp of claim 1 wherein the electroluminescent phosphor is a ZnS:Cu phosphor.

8. The lamp of claim 1 wherein the europium-activated alkaline earth phosphor comprises from about 5 to about 60 weight percent of the phosphor blend.

9. The lamp of claim 1 wherein the europium-activated alkaline earth phosphor comprises from about 5 to about 20 weight percent of the phosphor blend.

10. The lamp of claim 1 wherein the particles of the electroluminescent phosphor and the particles of the europium-activated alkaline earth phosphor individually have a coating of hydrolyzed trimethylaluminum.

11. A white-emitting electroluminescent lamp comprising a first transparent electrode, a second electrode, a first dielectric layer, and a second dielectric layer, the first and second dielectric layers being disposed between the electrodes;

the first dielectric layer being disposed adjacent to the first transparent electrode and having a phosphor blend dispersed in a first dielectric material;

the second dielectric layer being disposed adjacent to the second electrode and having a ferroelectric material dispersed in a second dielectric material; and the phosphor blend comprising of a mixture of particles of an electroluminescent phosphor and particles of an europium-activated alkaline earth phosphor having the general formula $Sr_{1-x}Ca_xS:Eu$ where $0 \leq x \leq 1$, the electroluminescent phosphor selected from a blue-emitting electroluminescent phosphor, a blue-green-emitting electroluminescent phosphor, or a combination thereof; and wherein the lamp exhibits a CRI of at least about 75.

12. The lamp of claim 11 wherein the lamp emits a white light having an x color coordinate of between about 0.245 and about 0.320 and a y color coordinate of between about 0.300 and about 0.700.

13. The lamp of claim 11 wherein the europium-activated alkaline earth phosphor comprises from about 5 to about 60 weight percent of the phosphor blend.

14. A phosphor blend comprising a mixture of particles of an electroluminescent phosphor and particles of an europium-activated alkaline earth phosphor having the general formula $Sr_{1-x}Ca_xS:Eu$ where $0 \leq x \leq 1$, the electroluminescent phosphor selected from a blue-emitting electroluminescent phosphor, a blue-green-emitting electroluminescent phosphor, or a combination thereof; and wherein the europium-activated alkaline earth phosphor comprises from about 5 to about 60 weight percent of the phosphor blend.

15. The phosphor blend of claim 14 wherein the electroluminescent phosphor emits primarily between about 400 nm to about 550 nm and the europium-activated alkaline earth phosphor emits primarily between about 580 nm to about 730 nm.

16. The phosphor blend of claim 14 wherein the electroluminescent phosphor is a ZnS:Cu phosphor.

17. The phosphor blend of claim 14 wherein the europium-activated alkaline earth phosphor comprises from about 5 to about 20 weight percent of the phosphor blend.

18. The phosphor blend of claim 17 wherein the electroluminescent phosphor is a ZnS:Cu phosphor.

19. The lamp of claim 1 wherein the europium-activated alkaline earth phosphor contains from 0 to about 2 weight percent Ca.

20. The lamp of claim 11 wherein the europium-activated alkaline earth phosphor contains from 0 to about 2 weight percent Ca.

21. The phosphor blend of claim 14 wherein the europium-activated alkaline earth phosphor contains from 0 to about 2 weight percent Ca.

* * * * *